J. C. CLIME.
Devices for Transmitting Power.

No. 135,466.  Patented Feb. 4, 1873.

WITNESSES
Thomas J. Dewley
Henry C. Benners

INVENTOR
John C. Clime
By His Attorney
Stephen Ustick

UNITED STATES PATENT OFFICE.

JOHN C. CLIME, OF PHILADELPHIA, PENNSYLVANIA, ASSIGNOR OF ONE-HALF HIS RIGHT TO ALLEN MIDDLETON, JR., OF SAME PLACE.

IMPROVEMENT IN DEVICES FOR TRANSMITTING POWER.

Specification forming part of Letters Patent No. 135,466, dated February 4, 1873.

*To all whom it may concern:*

Be it known that I, JOHN C. CLIME, of the city of Philadelphia and State of Pennsylvania, have invented certain Improvements in Transmitting Power, of which the following is a specification:

My invention relates to the combination, with the driving-shaft of a steam-engine or other motive power, of a swinging frame carrying a revolving shaft that is provided with one or more fly-wheels, and a gear-wheel which connects with a gear-wheel on the driving-shaft, the said fly-wheel shaft being combined with vertical oscillating rods by means of crank-pins extending from arms of the shaft or the sides of the fly-wheels, so that as the said crank-pins turn in their bearings in the upper ends of the oscillating rods, and the shaft in its bearings in the swinging frame, a very easy movement is given to the crank in the up-and-down movements of the swinging frame, whereby they are carried freely over the dead-points.

Figure 1:
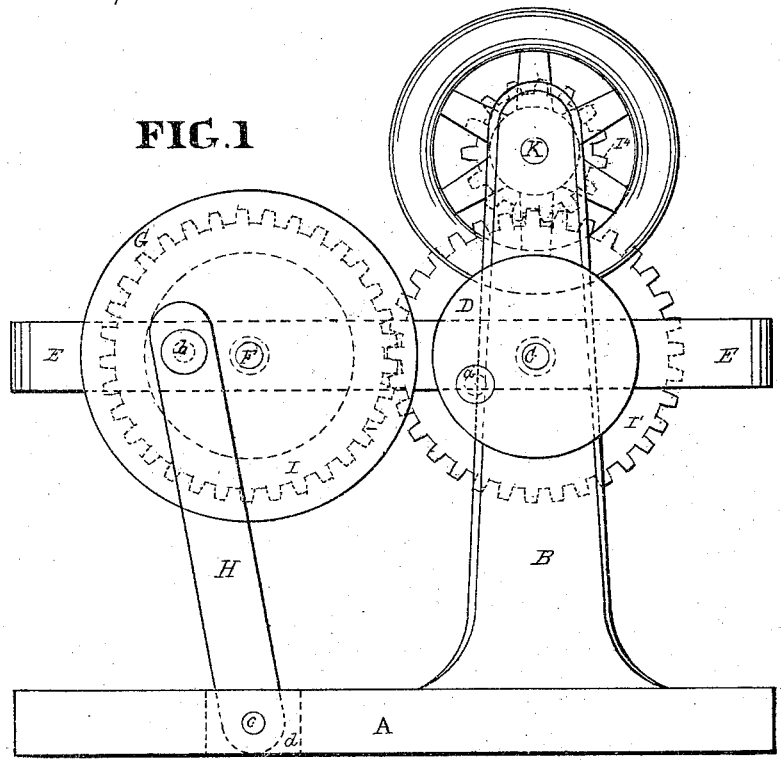
Figure 2:
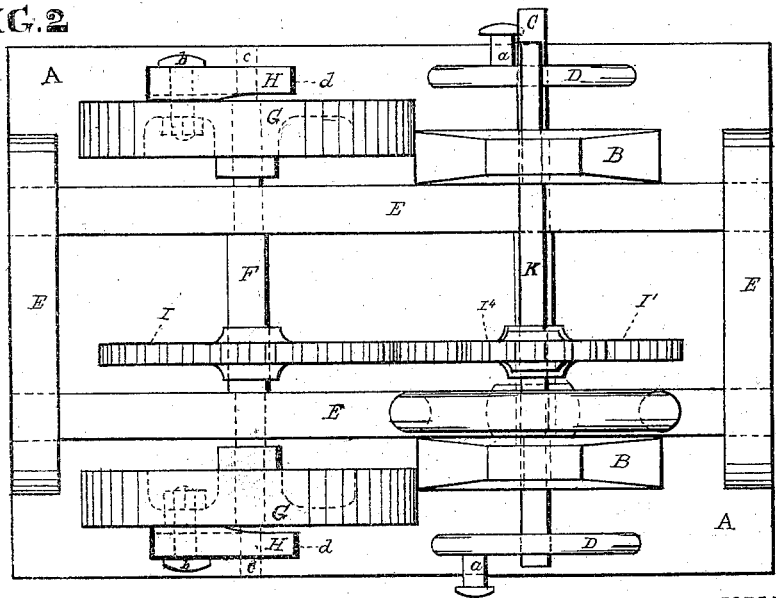

Figure 1 is a side elevation of the machine. Fig. 2 is a plan view of the same.

Like letters in all the figures indicate the same parts.

A is a bed-plate, and B B uprights connected therewith. C is a driving-shaft, which may be connected with a steam-engine or other motive power by means of the crank-pins $a$ $a$ of the wheels D D on the ends of the shaft, or by means of a pulley or otherwise. E is a swinging frame which has a free movement at one end on the driving-shaft C. The other end of the frame is provided with a revolving shaft, F, which has fly-wheels G G on its ends provided with crank-pins $b$ $b$, which connect with the upper ends of the rods H H, the lower ends of which are connected with the pins $c$ $c$ which pass through mortises $d$ $d$ of the bed-plate A. The fly-wheel shaft F is provided with a gear-wheel, I, which gears into the wheel $I^1$ on the driving-shaft C. Motion being communicated to the fly-wheel shaft F by the driving-shaft C acting through the gear-wheels I and $I^1$, the frame E being sustained by means of the crank-pins $b$ $b$ and vertical rods H H, as the shaft F revolves is caused to oscillate on the driving-shaft C, being regulated in its up-and-down movements by the connection of the shaft F therewith and the crank-pins with the rods H H, as before described, whereby the momentum of the fly-wheels is brought to act at all times upon the driving-shaft in such a manner as to carry the cranks freely over the dead-points. I have represented two fly-wheels on the shaft F, but it will readily be seen that one will answer by using crank-arms on the ends of the shaft for the connection of the crank-pins $b$ $b$. K is a mandrel, which has a geared connection with the driving-shaft C by means of the pinion $I^4$ gearing into the wheel $I^1$.

The mandrel may be provided with a face-plate for turning, or any other mechanical tool. It may also be so arranged as to be readily disconnected from the machine, and a revolving shaft for any purpose connected with the driving-shaft in the same or any other convenient manner.

I claim as my invention—

The combination of the revolving shaft F, provided with one or more fly-wheels and with crank-pins $b$ $b$, with the driving-shaft C by means of gear-wheels, and with oscillating rods H H and the frame E, having an oscillatory movement on the driving-shaft, substantially as and for the purpose set forth.

JOHN C. CLIME.

Witnesses:
    THOMAS J. BEWLEY,
    STEPHEN USTICK.